United States Patent
Guo et al.

(10) Patent No.: US 9,959,799 B2
(45) Date of Patent: May 1, 2018

(54) DRIVING METHOD AND DRIVING APPARATUS FOR DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 65 days.

(21) Appl. No.: 15/022,957

(22) PCT Filed: Oct. 15, 2015

(86) PCT No.: PCT/CN2015/091998
§ 371 (c)(1),
(2) Date: Mar. 18, 2016

(87) PCT Pub. No.: WO2016/145835
PCT Pub. Date: Sep. 22, 2016

(65) Prior Publication Data
US 2016/0275844 A1    Sep. 22, 2016

(30) Foreign Application Priority Data
Mar. 19, 2015 (CN) .......................... 2015 1 0122373

(51) Int. Cl.
G09G 3/20    (2006.01)
H04N 13/04    (2006.01)
G09G 3/00    (2006.01)

(52) U.S. Cl.
CPC ........... *G09G 3/2003* (2013.01); *G09G 3/003* (2013.01); *H04N 13/0422* (2013.01);
(Continued)

(58) Field of Classification Search
CPC ......... G09G 3/2003; G09G 2300/0452; G09G 2320/02; G09G 2310/0294; H04N 13/0422
See application file for complete search history.

(56) References Cited

U.S. PATENT DOCUMENTS 8,547,395 B1 *  10/2013  Hutchins ................. G06T 11/40
                                                345/611
2007/0086090 A1 *  4/2007  Wang .................... G02B 27/225
                                                359/464
(Continued)

FOREIGN PATENT DOCUMENTS

CN    103927946 A    7/2014
CN    103984108 A    8/2014
(Continued)

OTHER PUBLICATIONS

Second Chinese Office Action dated Apr. 19, 2017.
(Continued)

*Primary Examiner* — Alexander Eisen
*Assistant Examiner* — Kebede Teshome
(74) *Attorney, Agent, or Firm* — Dilworth & Barrese, LLP.; Michael J. Musella, Esq.

(57) ABSTRACT

A driving method for a 3D display apparatus and a driving apparatus thereof, the method includes: receiving an image signal and extracting a first view and a second view from the image signal (S31); dividing the first view and the second view respectively into multiple virtual pixels, and obtaining the color component corresponding to the color of each sub-pixel in the multiple virtual pixels (S32); arranging a
(Continued)

sampling region in the pixel array of the display apparatus for each sub-pixel of each view (S33); determining the gray scale signal of the sub-pixel corresponding to the sampling region according to the color component corresponding to the color of each sub-pixel in each virtual pixel covered by the sampling region (S34); and displaying the image signal according to the gray scale signals of the sub-pixels (S35).

18 Claims, 6 Drawing Sheets

(52) U.S. Cl.
CPC ............... *G09G 2300/0452* (2013.01); *G09G 2310/0294* (2013.01); *G09G 2320/02* (2013.01); *G09G 2340/0457* (2013.01); *G09G 2340/06* (2013.01)

(56) References Cited

U.S. PATENT DOCUMENTS

2007/0097145 A1\* 5/2007 Akenine-Moller ... G06T 3/4007
    345/611
2012/0133669 A1\* 5/2012 Chang .................... G06T 11/40
    345/593
2013/0241946 A1 9/2013 Jeong et al.
2014/0029095 A1\* 1/2014 Allio ................. H04N 13/0404
    359/464

FOREIGN PATENT DOCUMENTS

| | | |
|---|---|---|
| CN | 104297832 A | 1/2015 |
| CN | 104599625 A | 5/2015 |
| EP | 2333760 A2 | 6/2011 |

OTHER PUBLICATIONS

Chinese Office Action dated Sep. 13, 2016.
International Preliminary Report on Patentability dated Sep. 19, 2017.

\* cited by examiner

|    | S1  | S2  | S3  | S4  | S5  | S6  | S7  | S8  |
|----|-----|-----|-----|-----|-----|-----|-----|-----|
| R1 | B1  | B2  | B1  | B2  | B1  | B2  | B1  | B2  |
| R2 | G1  | G2  | G1  | G2  | G1  | G2  | G1  | G2  |
| R3 | R1  | R2  | R1  | R2  | R1  | R2  | R1  | R2  |
| R4 | B1  | B2  | B1  | B2  | B1  | B2  | B1  | B2  |
| R5 | G1  | G2  | G1  | G2  | G1  | G2  | G1  | G2  |
| R6 | R1  | R2  | R1  | R2  | R1  | R2  | R1  | R2  |
| R7 | B1  | B2  | B1  | B2  | B1  | B2  | B1  | B2  |
| R8 | G1  | G2  | G1  | G2  | G1  | G2  | G1  | G2  |
| R9 | R1  | R2  | R1  | R2  | R1  | R2  | R1  | R2  |
| R10| B1  | B2  | B1  | B2  | B1  | B2  | B1  | B2  |
| R11| G1  | G2  | G1  | G2  | G1  | G2  | G1  | G2  |
| R12| R1  | R2  | R1  | R2  | R1  | R2  | R1  | R2  |
| R13| B1  | B2  | B1  | B2  | B1  | B2  | B1  | B2  |
| R14| G1  | G2  | G1  | G2  | G1  | G2  | G1  | G2  |
| R15| R1  | R2  | R1  | R2  | R1  | R2  | R1  | R2  |

Fig.1

|    | S1  | S2  | S3  | S4  | S5  | S6  | S7  | S8  |
|----|-----|-----|-----|-----|-----|-----|-----|-----|
| R1 | B1  | B2  | B1  | B2  | B1  | B2  | B1  | B2  |
| R2 | G1  | G2  | G1  | G2  | G1  | G2  | G1  | G2  |
| R3 | R1  | R2  | R1  | R2  | R1  | R2  | R1  | R2  |
| R4 | B1  | B2  | B1  | B2  | B1  | B2  | B1  | B2  |
| R5 | G1  | G2  | G1  | G2  | G1  | G2  | G1  | G2  |
| R6 | R1  | R2  | R1  | R2  | R1  | R2  | R1  | R2  |
| R7 | B1  | B2  | B1  | B2  | B1  | B2  | B1  | B2  |
| R8 | G1  | G2  | G1  | G2  | G1  | G2  | G1  | G2  |
| R9 | R1  | R2  | R1  | R2  | R1  | R2  | R1  | R2  |
| R10| B1  | B2  | B1  | B2  | B1  | B2  | B1  | B2  |
| R11| G1  | G2  | G1  | G2  | G1  | G2  | G1  | G2  |
| R12| R1  | R2  | R1  | R2  | R1  | R2  | R1  | R2  |
| R13| B1  | B2  | B1  | B2  | B1  | B2  | B1  | B2  |
| R14| G1  | G2  | G1  | G2  | G1  | G2  | G1  | G2  |
| R15| R1  | R2  | R1  | R2  | R1  | R2  | R1  | R2  |

DRIVING METHOD AND DRIVING APPARATUS FOR DISPLAY APPARATUS

TECHNICAL FIELD OF THE DISCLOSURE

The present disclosure relates to the field of display technologies, in particular to a driving method and a driving apparatus for a displaying apparatus.

BACKGROUND

Human-being perceive depth of an object by small difference of the object seen by the left eye and the right eye, to recognize a stereographic image. Such a phenomenon that the left eye and the right eye see different images is referred to as parallax. The 3D (three dimensional) image display technologies artificially create parallax between the left eye and the right eye to make the left eye and the right eye receive two different images respectively. Eventually, the brain processes the two images obtained by the left eye and the right eye to produce the feeling of observing a real 3D object.

Like a conventional display apparatus, each pixel in a 3D display apparatus displays colors by mixing lights from several sub-pixels, for example, each pixel consists of one red sub-pixel, one green sub-pixel and one blue sub-pixel. In order to improve the visual effect, people raise higher requirement on the resolution of the display apparatus, which requires a smaller size of sub-pixels. However, due to the limitation of the process, the size of sub-pixels cannot be downsized infinitely. Therefore, how to improve the display effect of a 3D display apparatus in a case in which the sub-pixel has a certain size is a problem for those skilled in the art to solve.

SUMMARY

Embodiments of the present disclosure provide a driving method for a display apparatus and a driving apparatus for the display apparatus, which can improve the display effect of the 3D display apparatus in a case in which the sub-pixel has a certain size.

Accordingly, embodiments of the present disclosure adopt the following technical solutions.

In a first aspect, there is provided a driving method for a display apparatus, for driving a 3D display apparatus, wherein the 3D display apparatus comprises a pixel array comprising a first view pixel cell and a second view pixel cell; each of the first view pixel cell and the second view pixel cell is formed by N sub-pixels with different colors arranged cyclically in one column, where N is an integer larger than or equal to 3; the first view pixel cell and the second view pixel cell are arranged alternately in the column direction; each row of the pixel array comprises sub-pixels with an identical color; and the method comprises:

receiving an image signal and extracting a first view and a second view from the image signal;

dividing the first view and the second view respectively into multiple virtual pixels, and obtaining the color component corresponding to the color of each sub-pixel in the multiple virtual pixels;

arranging a sampling region in the pixel array of the display apparatus for each sub-pixel of each view;

determining the gray scale signal of the sub-pixel corresponding to the sampling region according to the color component corresponding to the color of each sub-pixel in each virtual pixel covered by the sampling region, wherein the virtual pixels covered by the sampling region and the sub-pixel corresponding to the sampling region belong to a same view; and displaying the image signal according to the gray scale signals of the sub-pixels.

Optionally, said determining the gray scale signal of the sub-pixel corresponding to the sampling region according to the color component corresponding to the color of each sub-pixel in each virtual pixel covered by the sampling region comprises:

obtaining the area of the sampling region;

obtaining the overlapping area between the sampling region and each virtual pixel covered by the sampling region; and determining the gray scale signal of the sub-pixel corresponding to the sampling region according to the area of the sampling region, the overlapping area and the color component corresponding to the color of each sub-pixel in each virtual pixel covered by the sampling region.

Optionally, the sampling region is a rectangle.

Optionally, the edges of the sampling region are located at the middle points of the connecting lines between the center of each sub-pixel and the centers of its respective adjacent sub-pixels of the same type, wherein the sub-pixels of the same type refers to the sub-pixels which belong to the same view and have the same color.

Optionally, the value of N is 3, and the colors of the sub-pixels are blue, green and red in turn.

In a second aspect, there is provided a driving apparatus for a display apparatus, for driving a 3D display apparatus, wherein the 3D display apparatus comprises a pixel array comprising a first view pixel cell and a second view pixel cell; each of the first view pixel cell and the second view pixel cell is formed by N sub-pixels with different colors arranged cyclically in one column, where N is an integer larger than or equal to 3; the first view pixel cell and the second view pixel cell are arranged alternately in the column direction; each row of the pixel array comprises sub-pixels with an identical color; and the driving apparatus comprises:

a receiving unit for receiving an image signal and extracting a first view and a second view from the image signal;

a dividing unit for dividing the first view and the second view respectively into multiple virtual pixels, and obtaining the color component corresponding to the color of each sub-pixel in the multiple virtual pixels;

a arranging unit for arranging a sampling region in the pixel array of the display apparatus for each sub-pixel of each view;

a processing unit for determining the gray scale signal of the sub-pixel corresponding to the sampling region according to the color component corresponding to the color of each sub-pixel in each virtual pixel covered by the sampling region, wherein the virtual pixels covered by the sampling region and the sub-pixel corresponding to the sampling region belong to the same view; and a displaying unit for displaying the image signal according to the gray scale signals of the sub-pixels.

Optionally, the processing unit comprises:

an obtaining sub-unit for obtaining the area of the sampling region;

the obtaining sub-unit being further used for obtaining the overlapping area between the sampling region and each virtual pixel; and a determining sub-unit for determining the gray scale signal of the sub-pixel corresponding to the sampling region according to the area of the sampling region, the overlapping area and the color component corresponding to the color of each sub-pixel in each virtual pixel covered by the sampling region.

Optionally, the sampling region is a rectangle.

Optionally, the edges of the sampling region are located at the middle points of the connecting lines between the center of each sub-pixel and the centers of its respective adjacent sub-pixels of the same type, wherein the sub-pixels of the same type belong to the same view and have the same color.

Optionally, the value of N is 3, and the colors of the sub-pixels are blue, green and red in turn.

In the driving method and the driving apparatus for the display apparatus according to embodiments of the present disclosure, firstly, signals to be displayed are received and a first view and a second view are extracted from the signals to be displayed; then the first view and the second view are divided respectively into multiple virtual pixels and the color component corresponding to the color of each sub-pixel in the multiple virtual pixels is obtained; then a sampling region is set in the pixel array of the display apparatus for each sub-pixel of each view; then the gray scale signal of the sub-pixel corresponding to the sampling region is determined according to the color component corresponding to the color of each sub-pixel in each virtual pixel covered by the sampling region; and finally the image signal is displayed according to the gray scale signal of each sub-pixel. Since the gray scale signal of each sub-pixel is determined according to the color component corresponding to the color of each sub-pixel in each virtual pixel covered by the sampling region, in the embodiment of the present disclosure, component gray scale signals of multiple sub-pixels can be displayed by using one sub-pixel in the pixel array, that is, the sub-pixel in the pixel array can be shared, to realize higher resolution in visual effect than the actual physical resolution. Therefore, in embodiments of the present disclosure, the display effect of the 3D display apparatus can be improved in a case in which the sub-pixel has a certain size.

BRIEF DESCRIPTION OF THE DRAWINGS

In order to describe the known technical solution or the technical solutions in embodiments of the present disclosure clearer, the figures needing to be used in the description on the embodiments or the known solutions will be briefly introduced in the following. Obviously, the figures in the following description only illustrate some embodiments of the present disclosure. Those skilled in the art can obtain other figures based on those figures without paying any creative work.

FIG. 1 is a schematic structural diagram of a pixel array in a 3D display apparatus to which a driving method for a display apparatus provided by the present disclosure is applied;

FIG. 2 is a schematic distribution diagram of a raster array applied to the pixel array illustrated in FIG. 1 provided by the present disclosure;

FIG. 7 is a schematic distribution diagram of the sampling region of the green sub-pixel in row R8, column S4 in the second view pixel cell provided by the present disclosure;

FIG. 8 is a schematic distribution diagram of the sampling region of the blue sub-pixel in row R7, column S5 in the first view pixel cell provided by the present disclosure;

DETAILED DESCRIPTION

Figure 3:
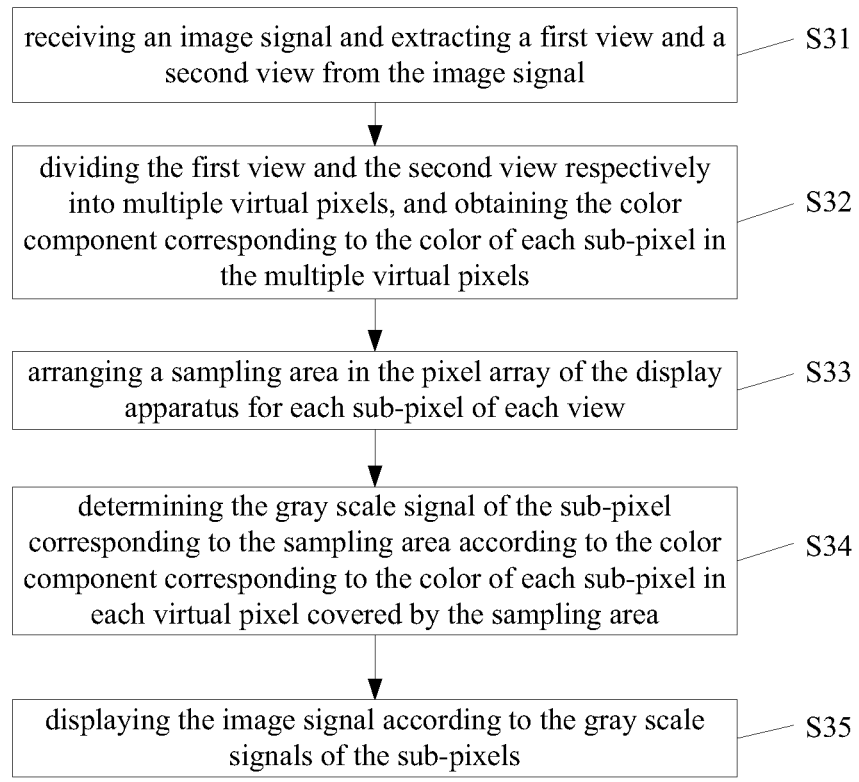
FIG. 3 is a flowchart of a driving method for a display apparatus provided by the present disclosure.

In the following, driving methods and driving apparatuses provided by embodiments of the present disclosure will be described in detail in combination with the figures, wherein the same reference signs refer to the same elements herein. In the following description, for better understanding, lots of details are provided for purpose of thoroughly understanding one or more embodiments. However, obviously, the embodiments can also be realized without those details. In other examples, well-known structures and devices are illustrated in blocks to facilitate description of one or more embodiments.

It is noted that the terms of row and column in embodiments of the present disclosure are relative concepts. In the description of the embodiments of the present disclosure, as an example, the row is in the horizontal direction, i.e., the lateral direction, and the column is in the vertical direction, i.e., the longitude direction. However, since the pixels are arranged in a form of array, the row and the column can be exchanged and the horizontal direction and the vertical direction can also be exchanged when the observation directions are different.

An embodiment of the present disclosure a driving method for a display apparatus for driving a 3D display apparatus. The 3D display apparatus comprises a pixel array and a raster array. Description will be made in the following by taking the case in which one pixel comprises sub-pixels of 3 colors and the sub-pixels of 3 colors are a blue sub-pixel, a green sub-pixel and a red sub-pixel as an example.

In particular, as illustrated in FIG. 1, the pixel array 10 comprises a first view pixel cell 11 and a second view pixel cell 12; each of the first view pixel cell 11 and the second view pixel cell 12 is formed by N sub-pixels with different colors arranged cyclically in one column, where N is an integer larger than or equal to 3; the first view pixel cell 11 and the second view pixel cell 12 are arranged alternately in the column direction; one row of the pixel array comprises sub-pixels with an identical color. As illustrated in FIG. 2, the raster array 20 shades a first side of the first view pixel cell 11 and a second side of the second view pixel cell 12 along the column direction. The position of the first side and the position of the second side in the view pixel cells where the first side and the second side are located respectively are opposite each other.

Exemplarily, the meaning that the position of the first side and the position of the second side in the view pixel cells where the first side and the second side are located respectively are opposite each other refers to the fact that in a case in which the first side of the first view pixel cell 11 is the right side of the first view pixel cell, the second side of the second view pixel cell 12 is the left side of the second view pixel cell, that in a case in which the first side of the first view pixel cell 11 is the left side of the first view pixel cell, the second side of the second view pixel cell 12 is the right side of the second view pixel cell.

In particular, as illustrated in FIG. 3, the method comprises the following steps.

At S31, an image signal is received and a first view and a second view are extracted from the image signal.

In particular, in step S31, a driving apparatus performing the method, after receiving the image signal, distinguishes in the received image signal an image signal to be displayed in the first view pixel cell from an image signal to be displayed in the second view pixel cell, and extracts such two image signals as the first view and the second view respectively.

At S32, the first view and the second view are divided respectively into multiple virtual pixels, and the color component corresponding to the color of each sub-pixel in the multiple virtual pixels is obtained.

Exemplarily, one pixel in the display apparatus (for example, one pixel comprises a blue sub-pixel, a green sub-pixel and a red sub-pixel consecutively in the column direction in the pixel cell illustrated in either view of FIG. 1 and FIG. 2) is divided as one virtual pixel. In particular, in step S32, the first view can be divided into multiple virtual pixels according to the number of physical pixels which can be included in the pixel array formed by the first view pixel cell in the pixel array of the display apparatus, and then the color component corresponding to the color of each sub-pixel in each virtual pixel can be determined, that is, the color components occupied by blue, green and red can be determined. Likewise, the second view can be divided into multiple virtual pixels and the color components occupied by blue, green and red in the second view can be determined in a same way. The above method for dividing the first view and the second view respectively into multiple virtual pixels is as follows: the first view and the second view are divided into multiple virtual pixels respectively according to the physical resolution of the display apparatus.

At S33, a sampling region is set in the pixel array of the display apparatus for each sub-pixel of each view.

At S34, the gray scale signal of the sub-pixel corresponding to the sampling region is determined according to the color component corresponding to the color of each sub-pixel in each virtual pixel covered by the sampling region, wherein the virtual pixels covered by the sampling region and the sub-pixel corresponding to the sampling region belong to the same view.

At S35, the image signal is displayed according to the gray scale signals of the sub-pixels.

In the driving method for the display apparatus according to an embodiment of the present disclosure, signals to be displayed are received and a first view and a second view are extracted from the signals to be displayed; then the first view and the second view are divided into multiple virtual pixels respectively and the color component corresponding to the color of each sub-pixel in the multiple virtual pixels is obtained; then a sampling region is set in the pixel array of the display apparatus for each sub-pixel of each view; then the gray scale signal of the sub-pixel corresponding to the sampling region is determined according to the color component corresponding to the color of each sub-pixel in each virtual pixel covered by the sampling region; and finally the image signal is displayed according to the gray scale signal of each sub-pixel. Since the gray scale signal of each sub-pixel is determined according to the color component corresponding to the color of each sub-pixel in each virtual pixel covered by the sampling region, in the embodiment of the present disclosure, the component gray scale signals of multiple sub-pixels can be displayed by using one sub-pixel in the pixel array, that is, the sub-pixels in the pixel array can be shared, to realize higher resolution in visual effect than the actual physical resolution. Therefore, in embodiments of the present disclosure, the display effect of a 3D display apparatus can be improved in a case in which the sub-pixel has a certain size.

Further, in step S34, the step of determining the gray scale signal of the sub-pixel corresponding to the sampling region according to the color component corresponding to the color of each sub-pixel in each virtual pixel covered by the sampling region comprises the following steps:

S341, obtaining the area of the sampling region;

S342, obtaining the overlapping area between the sampling region and each virtual pixel covered by the sampling region; and S343, determining the gray scale signal of the sub-pixel corresponding to the sampling region according to the area of the sampling region, the overlapping area and the color component corresponding to the color of each sub-pixel in each virtual pixel covered by the sampling region.

In particular, in step S343, determining the gray scale signal of the sub-pixel corresponding to the sampling region according to the area of the sampling region, the overlapping area and the color component corresponding to the color of each sub-pixel in each virtual pixel covered by the sampling region, can in particular be: for each sub-pixel, determining the overlapping area between the corresponding sampling region and each virtual pixel and the color component corresponding to the color of the sub-pixel in the virtual pixel; determining the product of the overlapping area corresponding to each virtual pixel and the corresponding color component; determining the gray scale signal of the sub-pixel according to the sum of respective products and the area of the sampling region, for example, the above process can be expressed by the following expression:

$$P = \sum_{i=1}^{n} p_i \frac{a_i}{A},$$

where P denotes the value of the gray scale signal of the sub-pixel, n denotes the number of virtual pixels covered by the sampling region, A denotes the area of the sampling region, $a_i$ denotes the overlapping area between the corresponding virtual pixel and the sampling region, and $p_i$ denotes the value of the color component corresponding to the color of the sub-pixel in the virtual pixel, in other words, if the sub-pixel is a red sub-pixel, $p_i$ is the value of the red component in the virtual pixel, if the sub-pixel is a blue sub-pixel, $p_i$ is the value of the blue component in the virtual pixel, or if the sub-pixel is a green sub-pixel, $p_i$ is the value of the green component in the virtual pixel.

Exemplarily, the sampling region is a rectangle.

Further, the edges of the sampling region are located at the middle points of the connecting lines between the center of each sub-pixel and the centers of its respective adjacent sub-pixels of the same type, wherein sub-pixels of the same type refers to the sub-pixels belong to the same view and have the same color. The sampling region is rectangle and is located at the middle points of the connecting lines between the center of each sub-pixel and the centers of its respective adjacent sub-pixels of the same type, which enables complete sampling of the entire display region without overlapping sampling, thus avoiding picture distortion due to incomplete sampling or overlapping sampling.

Figure 4:
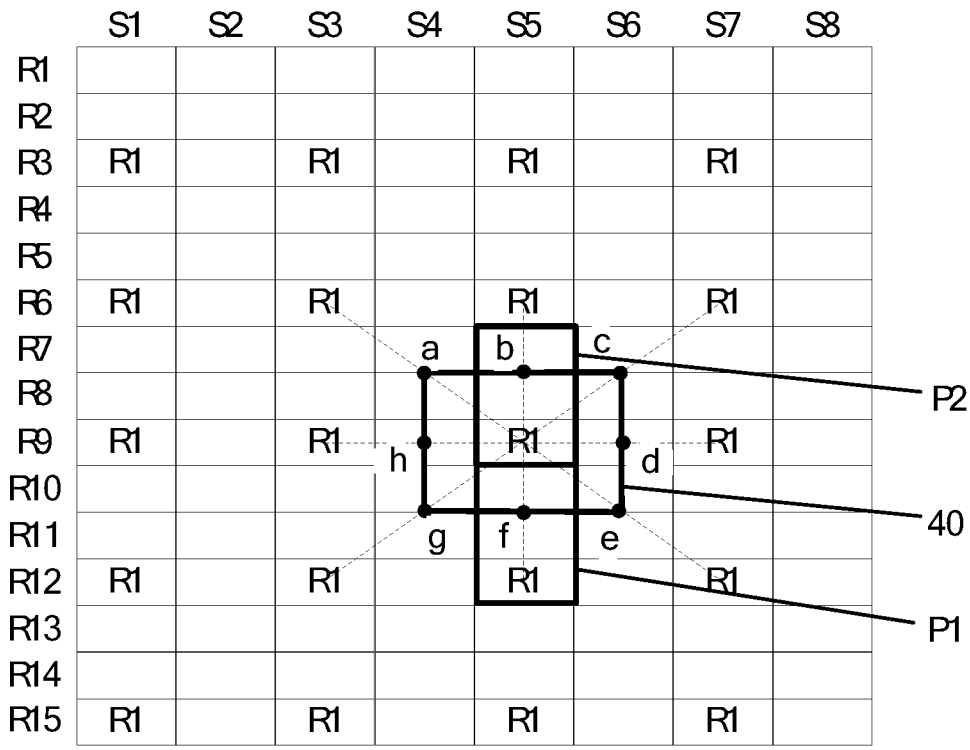
FIG. 4 is a schematic distribution diagram of the sampling region of the red sub-pixel in row R9, column S5 in a first view pixel cell provided by the present disclosure.
Figure 5:
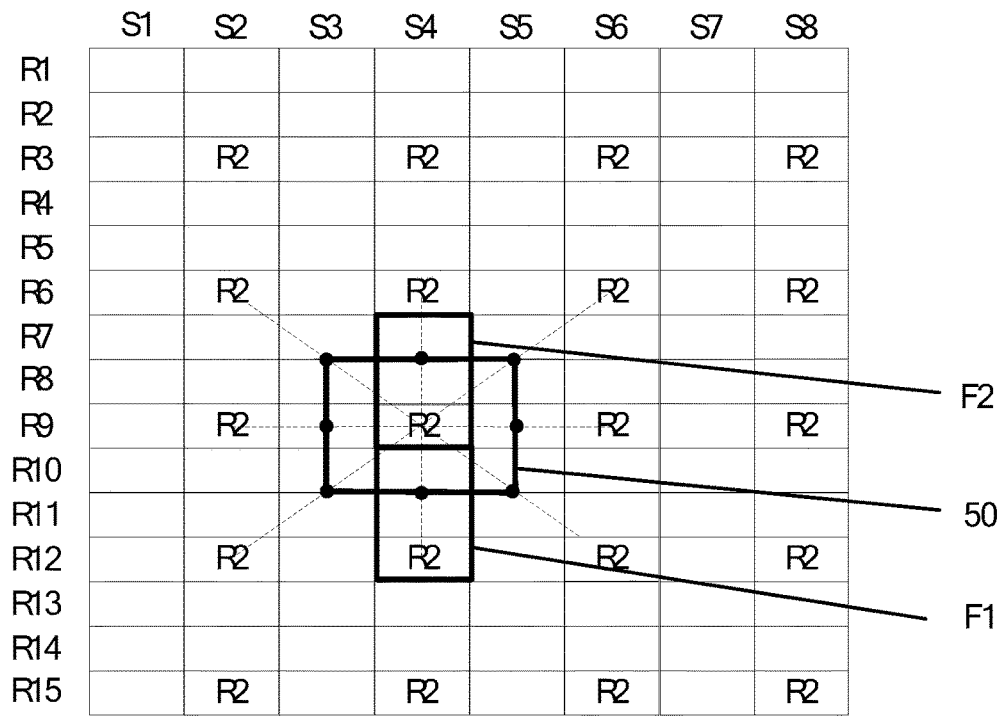
FIG. 5 is a schematic distribution diagram of the sampling region of the red sub-pixel in row R9, column S4 in a second view pixel cell provided by the present disclosure.

In particular, as illustrated in FIG. 4, description is made in FIG. 4 by taking the red sub-pixel R1 in row R9, column S5 in the first view pixel cell of the pixel array as an example. The sampling region 40 corresponding to the red sub-pixel in row R9, column S5 is a rectangle. The middle points of the connecting lines between the center of the sub-pixel in row R9, column S5 and the centers of its adjacent sub-pixels of the same type, that is, the red sub-pixel in row R6, column S3, the red sub-pixel in row R6, column S5, the red sub-pixel in row R6, column S7, the red sub-pixel in row R9, column S7, the red sub-pixel in row R12, column S7, the red sub-pixel in row R12, column S5, the red sub-pixel in row R12, column S3 and the red sub-pixel in row R9, column S3 are respectively a, b, c, d, e, f, g, h, and the middle points of the connecting lines between the center of the sub-pixel in row R9, column S5 and the centers of it adjacent sub-pixels of the same type a, b, c, d, e, f, g, h are all located at the edges of the rectangle sampling region 40. The area of one sub-pixel is taken as per unit area, the area of the sampling region 40 is six times that of per unit area. The virtual pixels overlapping the sampling region 40 and belonging to the same view with the sub-pixel in row R9, column S5 are P1 and P2. The overlapping area between the sampling region 40 and the virtual pixel P2 is the area of two sub-pixels, i.e., the area of two times that of per unit area, and the overlapping area between the sampling region 40 and the virtual pixel P1 is the area of one sub-pixel, i.e., the per unit area. In the above step S341, the area of the sampling region obtained is six times that of per unit area. In the step S342, the overlapping area between the sampling region and each virtual pixel is obtained, wherein the overlapping area between the sampling region and the virtual pixel P2 is two times that of per unit area, and the overlapping area between the sampling region and the virtual pixel P1 is per unit area. Similarly, as illustrated in FIG. 5, description is made in FIG. 5 by taking the determination of the red sub-pixel R2 in row R9, column S4 in the second view pixel cell of the pixel array as an example. The sampling region 50 corresponding to the red sub-pixel in row R9, column S4 is also a rectangle, and its determination process can refer to the determination process for the sampling region corresponding to the red sub-pixel in row R9, column S5 in FIG. 4, which will not be repeated herein. In FIG. 5, the area of the sampling region 50 is six times that of per unit area, wherein the overlapping area between the sampling region and F1 is per unit area, and the overlapping area between the sampling region and F2 is two times that of per unit area.

Figure 6:
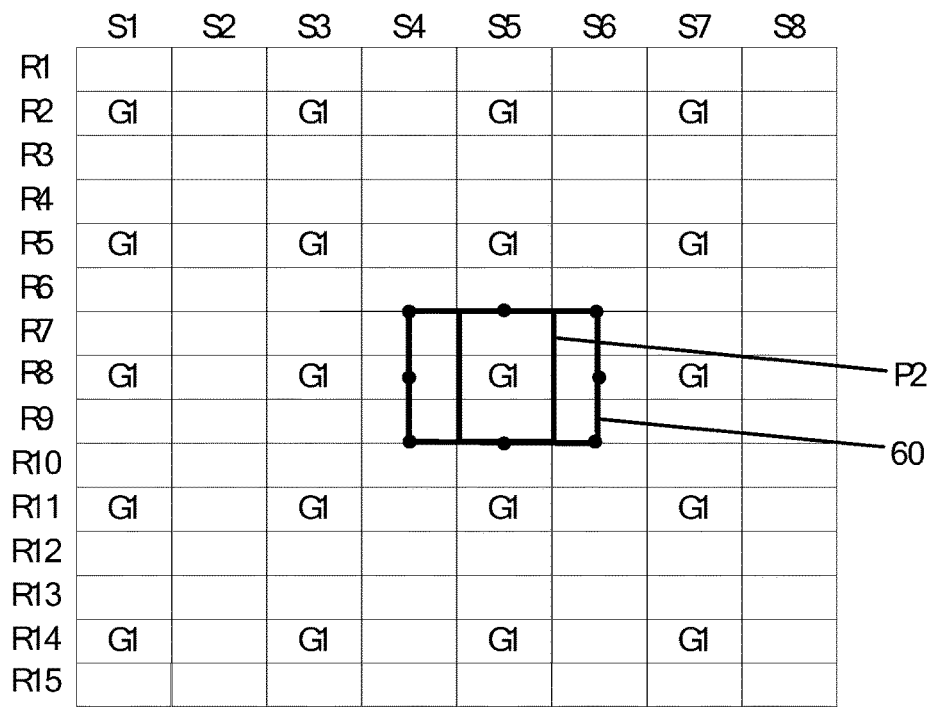
FIG. 6 is a schematic distribution diagram of the sampling region of the green sub-pixel in row R8, column S5 in the first view pixel cell provided by the present disclosure.

As illustrated in FIG. 6, description is made in FIG. 6 by taking the green sub-pixel G1 in row R8, column S5 in the first view pixel cell of the pixel array as an example. The sampling region 60 corresponding to the green sub-pixel G1 in row R8, column S5 is a rectangle. The sub-pixels of the same type adjacent to the green sub-pixel in row R8, column S5 are the green sub-pixel in row R5, column S3, the green sub-pixel in row R5, column S5, the green sub-pixel in row R5, column S7, the green sub-pixel in row R8, column S7, the green sub-pixel in row R11, column S7, the green sub-pixel in row R11, column S5, the green sub-pixel in row R11, column S3 and the green sub-pixel in row R8, column S3. The edges of the sampling region 60 are located at the middle points of the connecting lines between the center of the green sub-pixel in row R8, column S5 and the centers of the respective adjacent sub-pixels of the same type. Similarly, if the area of one sub-pixel is taken as per unit area, the area of the sampling region 60 is six times that of per unit area. The virtual pixel overlapping the sampling region 60 and belonging to the same view with the sub-pixel in row R8, column S5 is P2. The overlapping area between the sampling region 60 and the virtual pixel P2 is the area of three sub-pixels, i.e., three times that of per unit area. Similarly, as illustrated in FIG. 7, description is made in FIG. 7 by taking the determination of the green sub-pixel G2 in row R8, column S4 in the second view pixel cell of the pixel array as an example. The sampling region 70 corresponding to the green sub-pixel in row R8, column S4 is also a rectangle, and its determination process can refer to the determination process for the sampling region corresponding to the green sub-pixel in row R8, column S5 in FIG. 6, which will not be repeated herein. In FIG. 7, the area of the sampling region 70 is six times that of per unit area, and the overlapping area between the sampling region and F2 is three times that of per unit area.

Figure 9:
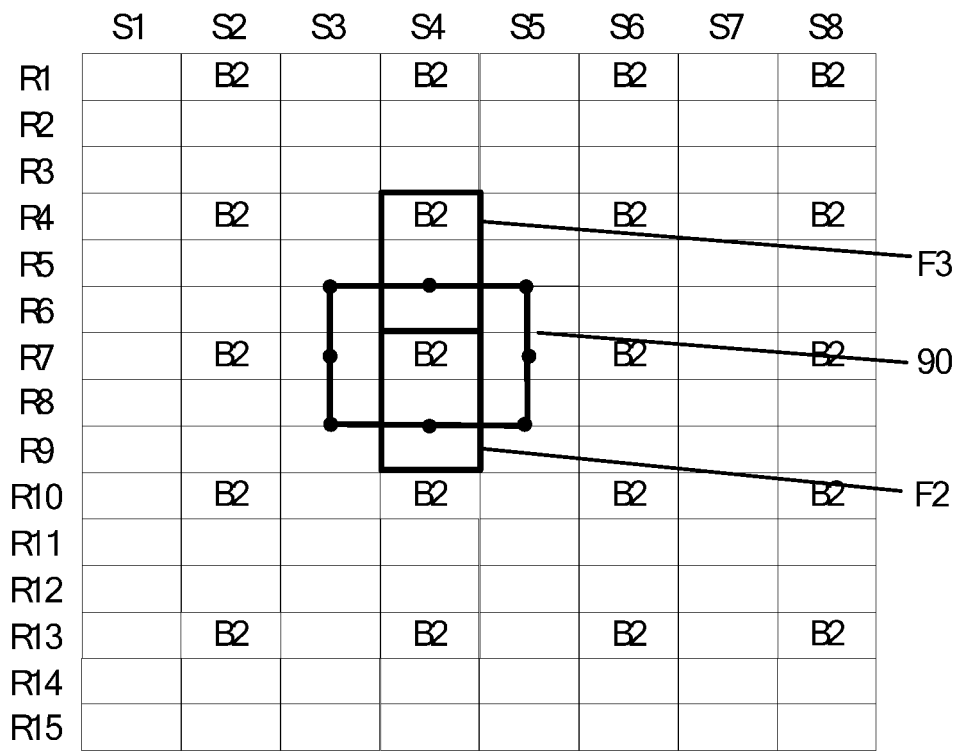
FIG. 9 is a schematic distribution diagram of the sampling region of the blue sub-pixel in row R7, column S4 in the second view pixel cell provided by the present disclosure.

As illustrated in FIG. 8, description is made in FIG. 8 by taking the blue sub-pixel in row R7, column S5 in the first view pixel cell of the pixel array as an example. The sampling region 80 corresponding to the blue sub-pixel in row R7, column S5 is a rectangle. The sub-pixels of the same type adjacent to the blue sub-pixel in row R7, column S5 are the blue sub-pixels in row R4, column S3, the blue sub-pixels in row R4, column S5, the blue sub-pixels in row R4, column S7, the blue sub-pixels in row R7, column S7, the blue sub-pixels in row R10, column S7, the blue sub-pixels in row R10, column S5, the blue sub-pixels in row R10, column S3 and the blue sub-pixels in row R7, column S3. The edges of the sampling region 80 are located at the middle points of the connecting lines between the center of the blue sub-pixel in row R7, column S5 and the centers of the respective adjacent sub-pixels of the same type. Similarly, if the area of one sub-pixel is taken as per unit area, the area of the sampling region 80 is six times that of per unit area. The virtual pixels overlapping the sampling region 80 and belonging to the same view with the sub-pixel in row R7, column S5 are P2 and P3. The overlapping area between the sampling region 80 and the virtual pixel P2 is the area of two sub-pixels, i.e., two times that of per unit area. The overlapping area between the sampling region 80 and the virtual pixel P3 is the area of one sub-pixel, i.e., per unit area. Similarly, as illustrated in FIG. 9, description is made in FIG. 9 by taking the determination of the blue sub-pixel B2 in row R7, column S4 in the second view pixel cell of the pixel array as an example. The sampling region 90 corresponding to the blue sub-pixel in row R7, column S4 is also a rectangle, and its determination process can refer to the determination process for the sampling region corresponding to the blue sub-pixel in row R7, column S5 in FIG. 8, which will not be repeated herein. In FIG. 9, the area of the sampling region 90 is six times that of per unit area, wherein the overlapping area between the sampling region and F2 is two times that of per unit area, and the overlapping area between the sampling region and F3 is per unit area.

Exemplarily, the value of N is 3, and the colors of the sub-pixels are blue, green and red in turn.

In particular, one pixel in the display apparatus comprises sub-pixels of 3 colors, and the sub-pixels are arranged as a blue sub-pixel, a green sub-pixel and a red sub-pixel sequentially in the column direction. Naturally, the sub-pixels can also be arranged in another order. For example, the colors of the sub-pixels are sequentially red, green, blue; or red, blue, green; or blue, red, green; or green, red, blue; or green, blue, red. In addition, the value of N can be another value, for example, the value of N is 4, and the colors of the sub-pixels are red, green, blue and white respectively. The arrangement order of the colors can be any arrangement order of the permutation and combination for the four colors red, green, blue and white.

Figure 10:
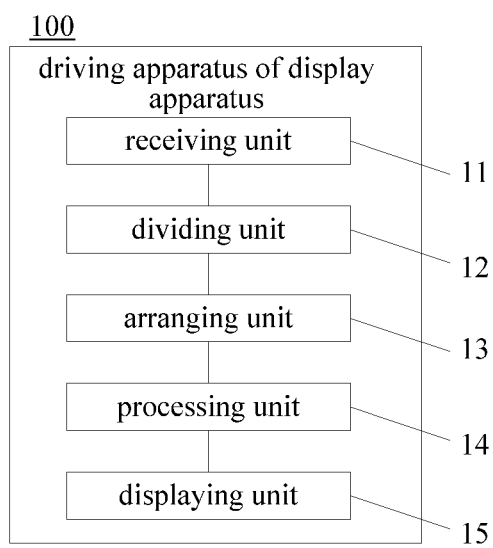
FIG. 10 is a schematic structural diagram of a driving apparatus for a display apparatus provided by the present disclosure.

An embodiment of the present disclosure provides a driving apparatus for a display apparatus for performing the method in the embodiments corresponding to FIG. 3. The apparatus is used for driving a 3D display apparatus, wherein the 3D display apparatus comprises a pixel array and a raster array. Similar to the above, description will be made in the following by taking a case in which one pixel comprises sub-pixels of 3 colors and the sub-pixels of 3 colors are a blue sub-pixel, a green sub-pixel and a red sub-pixel in turn as an example. As illustrated in FIG. 1, the pixel array comprises a first view pixel cell and a second view pixel cell; each of the first view pixel cell and the second view pixel cell is formed by N sub-pixels with different colors arranged cyclically in one column; the first view pixel cell and the second view pixel cell are arranged alternately in the column direction; each row of the pixel array comprises sub-pixels with an identical color. As illustrated in FIG. 2, the raster array shades a first side of the first view pixel cell and a second side of the second view pixel cell along the column direction, wherein the position of the first side and the position of the second side in the view pixel cells where the first side and the second side are located respectively are opposite each other. In particular, as illustrated in FIG. 10, the driving apparatus 100 comprises:

a receiving unit 11 for receiving an image signal and extracting a first view and a second view from the image signal;

a dividing unit 12 for dividing the first view and the second view respectively into multiple virtual pixels, and obtaining the color component corresponding to the color of each sub-pixel in the multiple virtual pixels;

a arranging unit 13 for arranging a sampling region in the pixel array of the display apparatus for each sub-pixel of each view;

a processing unit 14 for determining the gray scale signal of the sub-pixel corresponding to the sampling region according to the color component corresponding to the color of each sub-pixel in each virtual pixel covered by the sampling region, wherein the virtual pixels covered by the sampling region and the sub-pixel corresponding to the sampling region belong to the same view; and a displaying unit 15 for displaying the image signal according to the gray scale signals of the sub-pixels.

The driving apparatus for a display apparatus according to an embodiment of the present disclosure first receives signals to be displayed and extracts a first view and a second view from the signals to be displayed by the receiving unit; then divides the first view and the second view respectively into multiple virtual pixels and obtains the color component corresponding to the color of each sub-pixel in the multiple virtual pixels by the dividing unit; then by the arranging unit, sets a sampling region in the pixel array of the display apparatus for each sub-pixel of each view; then determines, by the processing unit, the gray scale signal of the sub-pixel corresponding to the sampling region according to the color component corresponding to the color of each sub-pixel in each virtual pixel covered by the sampling region; and finally by the displaying unit, displays the image signal according to the gray scale signal of each sub-pixel. Since the gray scale signal of each sub-pixel is determined according to the color component corresponding to the color of each sub-pixel in each virtual pixel covered by the sampling region, in the embodiment of the present disclosure, the component gray scale signals of multiple sub-pixels can be displayed by using one sub-pixel in the pixel array, that is, the sub-pixels in the pixel array can be shared, thus achieving higher resolution in visual effect than the actual physical resolution. Therefore, in embodiments of the present disclosure, the display effect of a 3D display apparatus can be improved in a case in which the sub-pixel has a certain size.

Figure 11:
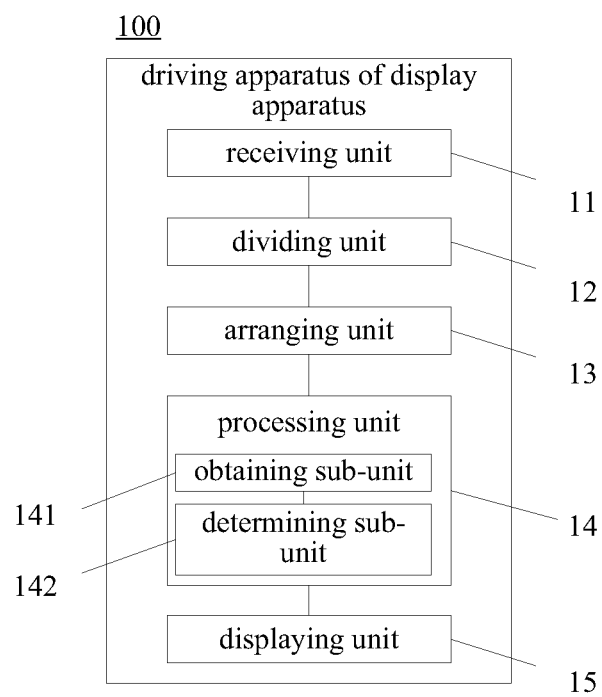
FIG. 11 is a schematic structural diagram of another driving apparatus for a display apparatus provided by the present disclosure.

Further, as illustrated in FIG. 11, the processing unit 14 comprises:

an obtaining sub-unit 141 for obtaining the area of the sampling region;

the obtaining sub-unit 141 being further used for obtaining the overlapping area between the sampling region and each virtual pixel covered by the sampling region; and a determining sub-unit 142 for determining the gray scale signal of the sub-pixel corresponding to the sampling region according to the area of the sampling region, the overlapping area and the color component corresponding to the color of each sub-pixel in each virtual pixel covered by the sampling region.

Further, the sampling region is a rectangle.

Further, the edges of the sampling region are located at the middle points of the connecting lines between the center of each sub-pixel and the centers of its respective adjacent sub-pixels of the same type, wherein the sub-pixels of the same type belong to the same view and have the same color.

Further, the value of N is 3, and the colors of the sub-pixels are blue, green and red in turn.

The above descriptions are only specific embodiments of the present disclosure, but are not intended to limit the present disclosure. Any modification or replacement that can easily occur to those skilled in the art within the technical scope of the present disclosure should fall within the protection scope of the present disclosure. Therefore, the protection scope of the present disclosure should be defined by the protection scope of the claims.

The present application claims the priority of Chinese Patent Application No. 201510122373.0 filed on Mar. 19, 2015, entire content of which is incorporated as part of the present invention by reference.

What is claimed is:

1. A driving method for a display apparatus, for driving a 3D display apparatus, wherein the 3D display apparatus comprises a pixel array comprising a first view pixel cell and a second view pixel cell, and each of the first view pixel cell and the second view pixel cell is formed by N sub-pixels with different colors arranged cyclically in one column, where N is an integer larger than or equal to 3; the first view pixel cell and the second view pixel cell are arranged alternately in a column direction; each row of the pixel array comprises sub-pixels with an identical color; and the method comprises:

receiving an image signal and extracting a first view and a second view from the image signal;

dividing the first view and the second view respectively into multiple virtual pixels, and obtaining a color component corresponding to a color of each sub-pixel in the multiple virtual pixels;

arranging a sampling region in the pixel array of the display apparatus for each sub-pixel of each view;

determining a gray scale signal of the sub-pixel corresponding to the sampling region according to the color component corresponding to the color of each sub-pixel in each virtual pixel covered by the sampling region, wherein the virtual pixel covered by the sampling region and the sub-pixel corresponding to the sampling region belong to a same view; and displaying the image signal according to the gray scale signal of the sub-pixel.

2. The method according to claim 1, wherein said determining the gray scale signal of the sub-pixel corresponding to the sampling region according to the color component corresponding to the color of each sub-pixel in each virtual pixel covered by the sampling region comprises:

obtaining an area of the sampling region;

obtaining an overlapping area between the sampling region and each virtual pixel covered by the sampling region; and determining the gray scale signal of the sub-pixel corresponding to the sampling region according to the area of the sampling region, the overlapping area and the color component corresponding to the color of each sub-pixel in each virtual pixel covered by the sampling region.

3. The method according to claim 1, wherein the sampling region is a rectangle.

4. The method according to claim 3, wherein edges of the sampling region are located at middle points of connecting lines between a center of each sub-pixel and respective centers of its respective adjacent sub-pixels of a same type, and the sub-pixels of the same type belong to a same view and have a same color.

5. The method according to claim 1, wherein a value of N is 3, and colors of the sub-pixels are blue, green and red in turn.

6. A driving apparatus for a display apparatus, for driving a 3D display apparatus, wherein the 3D display apparatus comprises a pixel array comprising a first view pixel cell and a second view pixel cell; each of the first view pixel cell and the second view pixel cell is formed by N sub-pixels with different colors arranged cyclically in one column, where N is an integer larger than or equal to 3; the first view pixel cell and the second view pixel cell are arranged alternately in a column direction; each row of the pixel array comprises sub-pixels with an identical color; and the driving apparatus comprises:

a receiving unit configured to receive an image signal and extract a first view and a second view from the image signal;

a dividing unit configured to divide the first view and the second view respectively into multiple virtual pixels, and to obtain a color component corresponding to a color of each sub-pixel in the multiple virtual pixels;

a arranging unit configured to arranging a sampling region in the pixel array of the display apparatus for each sub-pixel of each view;

a processing unit configured to determine a gray scale signal of the sub-pixel corresponding to the sampling region according to the color component corresponding to the color of each sub-pixel in each virtual pixel covered by the sampling region, wherein the virtual pixel covered by the sampling region and the sub-pixel corresponding to the sampling region belong to a same view; and a displaying unit configured to display the image signal according to the gray scale signal of the sub-pixel.

7. The driving apparatus according to claim 6, wherein the processing unit comprises:

an obtaining sub-unit configured to obtain an area of the sampling region;

the obtaining sub-unit being further configured to obtain an overlapping area between the sampling region and each virtual pixel covered by the sampling region; and a determining sub-unit configured to determine the gray scale signal of the sub-pixel corresponding to the sampling region according to the area of the sampling region, the overlapping area and the color component corresponding to the color of each sub-pixel in each virtual pixel covered by the sampling region.

8. The driving apparatus according to claim 6, wherein the sampling region is a rectangle.

9. The driving apparatus according to claim 8, wherein edges of the sampling region are located at middle points of connecting lines between a center of each sub-pixel and centers of its respective adjacent sub-pixels of a same type, wherein the sub-pixels of the same type belong to a same view and have a same color.

10. The driving apparatus according to claim 9, wherein a value of N is 3, and colors of the sub-pixels are blue, green and red in turn.

11. The method according to claim 2, wherein the sampling region is a rectangle.

12. The method according to claim 2, wherein a value of N is 3, and colors of the sub-pixels are blue, green and red in turn.

13. The method according to claim 3, wherein a value of N is 3, and colors of the sub-pixels are blue, green and red in turn.

14. The method according to claim 4, wherein a value of N is 3, and colors of the sub-pixels are blue, green and red in turn.

15. The driving apparatus according to claim 7, wherein the sampling region is a rectangle.

16. The driving apparatus according to claim 7, wherein a value of N is 3, and colors of the sub-pixels are blue, green and red in turn.

17. The driving apparatus according to claim 8, wherein a value of N is 3, and colors of the sub-pixels are blue, green and red in turn.

18. The driving apparatus according to claim 9, wherein a value of N is 3, and colors of the sub-pixels are blue, green and red in turn.

* * * * *